United States Patent
Hanna et al.

(10) Patent No.: US 8,245,758 B2
(45) Date of Patent: *Aug. 21, 2012

(54) COULOMB DAMPED DISC BRAKE ROTOR AND METHOD OF MANUFACTURING

(75) Inventors: Michael D. Hanna, West Bloomfield, MI (US); James G. Schroth, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1181 days.

This patent is subject to a terminal disclaimer.

(21) Appl. No.: 11/554,234

(22) Filed: Oct. 30, 2006

(65) Prior Publication Data

US 2008/0099289 A1     May 1, 2008

(51) Int. Cl.
*B22D 19/00* (2006.01)
*B22D 19/16* (2006.01)
(52) U.S. Cl. .......................... 164/98; 164/100; 164/112
(58) Field of Classification Search .................. 164/98, 164/100, 112, 137
See application file for complete search history.

(56) References Cited

U.S. PATENT DOCUMENTS

| | | | |
|---|---|---|---|
| 974,024 A | 10/1910 | Carter | |
| 1,484,421 A | 2/1924 | Thomspon | |
| 1,989,211 A | 1/1935 | Norton | |
| 2,012,838 A | 8/1935 | Tilden | |
| 2,026,878 A | 1/1936 | Farr | |
| 2,288,438 A | 6/1942 | Dach | |
| 2,603,316 A | 7/1952 | Pierce | |
| 2,978,793 A | 4/1961 | Lamson et al. | |
| 3,085,391 A | 4/1963 | Hatfield et al. | |
| 3,127,959 A | 4/1964 | Wengrowski | |
| 3,147,828 A | 9/1964 | Hunsaker | |
| 3,292,746 A | 12/1966 | Robinette | 188/218 |
| 3,378,115 A | 4/1968 | Stephens, III | |
| 3,425,523 A | 2/1969 | Robinette | 188/218 |
| 3,509,973 A | 5/1970 | Kimata | |

(Continued)

FOREIGN PATENT DOCUMENTS

CH     428319 A     1/1967

(Continued)

OTHER PUBLICATIONS

Disc Brake Squeal: Diagnosis and prevention, SAE publication 03NVC-224, O.Dessouki, G.Drake, B.Lowe, and W.K.Chang. 7 pages, dated 2002.

(Continued)

*Primary Examiner* — Kevin P Kerns
(74) *Attorney, Agent, or Firm* — BrooksGroup

(57) ABSTRACT

The invention provides a method for manufacturing a coulomb damped disc brake rotor, including the steps of: (A) providing a mold having the general shape of the coulomb damped disc brake rotor; (B) placing a coulomb damper insert having a generally annular body and at least one tab extending generally radially from the generally annular body, wherein the at least one tab operates to locate the coulomb damper insert within the mold, and wherein the at least one tab at least partially defines an orifice with its major axis generally coincident with the periphery of the coulomb damped disc brake rotor; and (C) causing casting material to enter the mold to substantially encapsulate the coulomb damper insert with the casting material to form a rotor cheek of the coulomb damped disc brake rotor. A coulomb damper insert and coulomb damped disc brake rotor are also disclosed.

31 Claims, 2 Drawing Sheets

U.S. PATENT DOCUMENTS

| | | |
|---|---|---|
| 3,575,270 A | 4/1971 | Reinbek et al. |
| 3,774,472 A | 11/1973 | Mitchell |
| 3,841,448 A | 10/1974 | Norton, Jr. |
| 3,975,894 A | 8/1976 | Suzuki |
| 4,049,085 A | 9/1977 | Blunier |
| 4,072,219 A | 2/1978 | Hahm et al. |
| 4,195,713 A | 4/1980 | Hagbjer et al. |
| 4,250,950 A | 2/1981 | Buxmann et al. |
| 4,278,153 A | 7/1981 | Venkatu |
| 4,338,758 A | 7/1982 | Hagbjer |
| 4,379,501 A | 4/1983 | Hagiwara et al. ............. 188/218 |
| 4,475,634 A | 10/1984 | Flaim et al. |
| 4,523,666 A | 6/1985 | Murray ........................ 188/218 |
| 4,529,079 A | 7/1985 | Albertson |
| 4,905,299 A | 2/1990 | Ferraiuolo et al. |
| 5,004,078 A * | 4/1991 | Oono et al. ............... 188/218 A |
| 5,025,547 A | 6/1991 | Sheu et al. |
| 5,083,643 A | 1/1992 | Hummel et al. |
| 5,115,891 A | 5/1992 | Raitzer et al. |
| 5,139,117 A | 8/1992 | Melinat .......................... 188/264 |
| 5,143,184 A | 9/1992 | Snyder et al. .................. 188/218 |
| 5,183,632 A | 2/1993 | Kiuchi et al. |
| 5,184,662 A | 2/1993 | Quick et al. |
| 5,259,486 A | 11/1993 | Deane |
| 5,310,025 A | 5/1994 | Anderson |
| 5,416,962 A | 5/1995 | Passarella ........................ 29/173 |
| 5,417,313 A | 5/1995 | Matsuzaki et al. ............ 188/264 |
| 5,509,510 A | 4/1996 | Ihm |
| 5,530,213 A | 6/1996 | Hartsock et al. |
| 5,582,231 A | 12/1996 | Siak et al. |
| 5,620,042 A * | 4/1997 | Ihm ................................. 164/95 |
| 5,660,251 A | 8/1997 | Nishizawa et al. |
| 5,789,066 A | 8/1998 | DeMare et al. |
| 5,819,882 A | 10/1998 | Reynolds et al. |
| 5,855,257 A | 1/1999 | Wickert et al. ................. 188/218 |
| 5,862,892 A | 1/1999 | Conley |
| 5,878,843 A | 3/1999 | Saum ............................. 188/218 |
| 5,927,447 A | 7/1999 | Dickerson |
| 5,965,249 A | 10/1999 | Sutton et al. |
| 6,047,794 A | 4/2000 | Nishizawa |
| 6,073,735 A | 6/2000 | Botsch et al. |
| 6,112,865 A | 9/2000 | Wickert et al. |
| 6,206,150 B1 | 3/2001 | Hill |
| 6,216,827 B1 | 4/2001 | Ichiba et al. |
| 6,223,866 B1 | 5/2001 | Giacomazza |
| 6,231,456 B1 | 5/2001 | Rennie et al. |
| 6,241,055 B1 | 6/2001 | Daudi |
| 6,241,056 B1 | 6/2001 | Cullen et al. |
| 6,283,258 B1 | 9/2001 | Chen et al. |
| 6,302,246 B1 | 10/2001 | Naumann et al. ........ 188/218 XL |
| 6,357,557 B1 | 3/2002 | DiPonio |
| 6,405,839 B1 | 6/2002 | Ballinger et al. |
| 6,465,110 B1 | 10/2002 | Boss et al. ..................... 428/608 |
| 6,481,545 B1 | 11/2002 | Yano et al. |
| 6,505,716 B1 | 1/2003 | Daudi et al. ................... 188/250 |
| 6,507,716 B2 | 1/2003 | Nomura et al. ................. 399/80 |
| 6,543,518 B1 | 4/2003 | Bend et al. |
| 6,648,055 B1 | 11/2003 | Haug et al. |
| 6,799,664 B1 | 10/2004 | Connolly |
| 6,880,681 B2 | 4/2005 | Koizumi et al. |
| 6,890,218 B2 | 5/2005 | Patwardhan et al. |
| 6,899,158 B2 | 5/2005 | Matuura et al. |
| 6,932,917 B2 | 8/2005 | Golden et al. |
| 6,945,309 B2 | 9/2005 | Frait et al. |
| 7,066,235 B2 | 6/2006 | Huang |
| 7,112,749 B2 | 9/2006 | DiPaola et al. |
| 7,178,795 B2 | 2/2007 | Huprikar et al. |
| 7,293,755 B2 | 11/2007 | Miyahara et al. |
| 7,594,568 B2 | 9/2009 | Hanna et al. |
| 7,604,098 B2 | 10/2009 | Dessouki et al. |
| 7,644,750 B2 | 1/2010 | Schroth et al. |
| 7,775,332 B2 * | 8/2010 | Hanna et al. ............ 188/218 XL |
| 7,836,938 B2 | 11/2010 | Agarwal et al. |
| 7,937,819 B2 * | 5/2011 | Hanna et al. ..................... 29/458 |
| 2002/0084156 A1 | 7/2002 | Ballinger et al. |
| 2002/0104721 A1 | 8/2002 | Schaus et al. |
| 2003/0037999 A1 | 2/2003 | Tanaka et al. |
| 2003/0127297 A1 | 7/2003 | Smith et al. |
| 2003/0141154 A1 | 7/2003 | Rancourt et al. ............... 188/218 |
| 2003/0213658 A1 | 11/2003 | Baba |
| 2004/0031581 A1 | 2/2004 | Herreid et al. |
| 2004/0045692 A1 | 3/2004 | Redemske |
| 2004/0074712 A1 | 4/2004 | Quaglia et al. |
| 2004/0084260 A1 | 5/2004 | Hoyte et al. |
| 2004/0242363 A1 | 12/2004 | Kohno et al. |
| 2005/0011628 A1 * | 1/2005 | Frait et al. ...................... 164/132 |
| 2005/0150222 A1 | 7/2005 | Kalish et al. |
| 2005/0183909 A1 | 8/2005 | Rau, III et al. .......... 188/218 XL |
| 2005/0193976 A1 | 9/2005 | Suzuki et al. |
| 2006/0076200 A1 | 4/2006 | Dessouki et al. ............. 188/218 |
| 2006/0243547 A1 | 11/2006 | Keller |
| 2007/0039710 A1 | 2/2007 | Newcomb |
| 2007/0056815 A1 | 3/2007 | Hanna et al. |
| 2007/0062664 A1 | 3/2007 | Schroth et al. |
| 2007/0062768 A1 * | 3/2007 | Hanna et al. ............ 188/218 XL |
| 2007/0142149 A1 | 6/2007 | Kleber |
| 2007/0166425 A1 | 7/2007 | Utsugi |
| 2007/0235270 A1 | 10/2007 | Miskinis et al. |
| 2007/0298275 A1 | 12/2007 | Carter et al. |
| 2008/0099289 A1 | 5/2008 | Hanna et al. |
| 2008/0185249 A1 | 8/2008 | Schroth et al. |
| 2009/0032569 A1 | 2/2009 | Sachdev et al. |
| 2009/0107787 A1 * | 4/2009 | Walker et al. .................. 188/381 |

FOREIGN PATENT DOCUMENTS

| | | |
|---|---|---|
| CN | 20051113784 A | 10/2005 |
| CN | 1757948 A | 4/2006 |
| CN | 2863313 Y | 1/2007 |
| DE | 2446938 A1 | 4/1976 |
| DE | 2537038 A1 | 3/1977 |
| DE | 19649919 A1 | 6/1998 |
| DE | 19948009 C1 | 3/2001 |
| DE | 60000008 T2 | 3/2002 |
| DE | 10141698 A1 | 3/2003 |
| DE | 102005048258 A1 | 4/2006 |
| DE | 60116780 T2 | 11/2006 |
| EP | 0205713 A1 | 12/1986 |
| GB | 1230274 | 4/1971 |
| GB | 2 328 952 | 3/1999 |
| JP | 57154533 A | 9/1982 |
| JP | 1126434 U1 | 8/1989 |
| JP | 05-104567 | 4/1993 |
| JP | 11342461 A | 12/1999 |
| JP | 2003214465 A | 7/2003 |
| JP | 2004011841 A | 1/2004 |
| KR | 20010049837 A | 6/2001 |
| WO | 9823877 A1 | 6/1998 |
| WO | 0136836 A1 | 5/2001 |
| WO | 2007035206 A2 | 3/2007 |

OTHER PUBLICATIONS

International Search Report dated Apr. 2, 2007 for PCT/US06/29687 filed Jul. 31, 2006 and relating to this application.

Z. Wu, C. Richter, L. Menon, A Study of Anodization Process During Pore Formation in Nanoporous Alumina Templates, Journal of the Electrochemical Society, vol. 154, 2007.

W.-J. Lee, M. Alhoshan, W.H. Smyrl, Titanium Dioxide Nanotube Arrays Fabricated by Anodizing Processes, Journal of the Electrochemical Society, vol. 153, 2006, pp. B499-B505.

I.V. Sieber, P. Schmuki, Porous Tantalum Oxide Prepared by Electrochemical Anodic Oxidation, Journal of the Electrochemical Society, vol. 152, 2005, pp. C639-C644.

H. Tanaka, A. Shimada, A. Kinoshita, In situ Measurement of the Diameter of Nanopores in Silicon During Anodization in Hydrofluoric Acid Solution, Journal of the Electrochemic.

L.G. Hector, Jr., S. Sheu, Focused Energy Beam Work Roll Surface Texturing Science and Technology, Journal of Materials Processing & Manufacturing Science, vol. 2, Jul. 1993.

P.N. Anyalebechi, Ungrooved Mold Surface Topography Effects on Cast Subsurface Microstructure, Materials Processing Fundamentals, TMS 2007, pp. 49-62.

F. Yigit, Critical Wavelengths for Gap Nucleation in Solidification—Part 1: Theoretical Methodology, Journal of Applied Mechanics, vol. 67, Mar. 2000, pp. 66-76.

P.N. Anyalebechi, Undulatory Solid Shell Growth of Aluminum Alloy 3003 as a Function of the Wavelength of a Grooved Mold Surface Topography, TMS 2007, pp. 31-47.

Dessouki et al., U.S. Appl. No. 10/961,813, Coulumb friction damped disc brake rotors, filed Oct. 8, 2004.

Hanna et al., U.S. Appl. No. 11/475,756, Bi-metal disc brake rotor and method of manufacturing, filed Jun. 27, 2006.

Schroth et al., U.S. Appl. No. 11/475,759, Method of casting components with inserts for noise reduction, filed Jun. 27, 2006.

Schroth et al., U.S. Appl. No. 12/025,967, Damped products and methods of making and using the same, filed Feb. 5, 2008.

Hanna et al., U.S. Appl. No. 11/440,916, Bi-metal disc brake rotor and method of manufacture, filed May 25, 2006.

Walker et al., U.S. Appl. No. 11/926,798, Inserts with holes for damped products and methods of making and using the same, filed Oct. 29, 2007.

Hanna et al., U.S. Appl. No. 11/832,401, Damped product with insert and method of making the same, filed Aug. 1, 2007.

Kleber, et al., U.S. Appl. No. 11/848,732, Cast-in-place torsion joint, filed Aug. 31, 2007.

Hanna et al., U.S. Appl. No. 11/780,679, Method of manufacturing a damped part, filed Jul. 20, 2007.

Aase et al., U.S. Appl. No. 11/969,259, Method of forming casting with frictional damping insert, filed Jan. 4, 2008.

Hanna et al., U.S. Appl. No. 12/165,729, Method for securing an insert in the manufacture of a damped part, filed Jul. 1, 2008.

Hanna et al., U.S. Appl. No. 12/165,731, Product with metallic foam and method of manufacturing the same, filed Jul. 1, 2008.

Agarwal et al., U.S. Appl. No. 11/860,049, Insert with tabs and damped products and methods of making the same, filed Sep. 24, 2007.

Hanna et al., U.S. Appl. No. 12/174,163, Damped part, filed Jul. 16, 2008.

Hanna et al., U.S. Appl. No. 12/174,223, Method of casting damped part with insert, filed Jul. 16, 2008.

Hanna et al., U.S. Appl. No. 12/183,180, Casting noise-damped, vented brake rotors with embedded inserts, filed Jul. 31, 2008.

Hanna et al., U.S. Appl. No. 12/183,104, Low mass multi-piece sound damped article, filed Jul. 31, 2008.

Golden et al., U.S. Appl. No. 12/105,411, Insert with filler to dampen vibrating components, filed Apr. 18, 2008.

Hanna et al., U.S. Appl. No. 11/440,893, Rotor assembly and method, filed May 25, 2006.

Carter, U.S. Appl. No. 11/680,179, Damped automotive components with cast in place inserts and method of making same, filed Feb. 28, 2007.

Ulicny et al., U.S. Appl. No. 12/105,438, Filler material to dampen vibrating components, filed Apr. 18, 2008.

Hanna et al., U.S. Appl. No. 12/272,164, Surface configurations for damping inserts, filed Nov. 17, 2008.

Hanna et al., U.S. Appl. No. 12/145,169, Damped product with an insert having a layer including graphite thereon and methods of making and using the same, filed Jun. 24, 2008.

Lowe et al., U.S. Appl. No. 12/174,320, Damped part with insert, filed Jul. 16, 2008.

Xia, U.S. Appl. No. 11/858,596, Lightweight brake rotor and components with composite materials, filed Sep. 20, 2007.

Dessouki et al., U.S. Appl. No. 12/178,872, Friction damped brake drum, filed Jul. 24, 2008.

Sachdev et al., U.S. Appl. No. 11/832,356, Friction welding method and products made using the same, filed Aug. 1, 2007.

Chinese First Office Action; CN200510113784.X; Dated May 18, 2007; 19 pages.

Chinese Second Office Action; CN200510113784.X; Dated Feb. 15, 2008; 13 pages.

German Examination Report; DE102005048258.9-12; Dated Oct. 22, 2007; 8 pages.

Gerdemann, Steven J,; TITANIUM Process Technologies; Advanced Materials & Processes, Jul. 2001, pp. 41-43.

Mahoney, M. W. & Lynch S. P.; Friction-Stir Processing; 15 pages.

MPIF: All You Need to Know about Powder Metallurgy; http://www.mpif.org/IntroPM/intropm/asp?linkid=1; 8 pages.

Powder Metallurgy—Wikipedia article; http://en.wikipedia.org/wiki/Powder_metallurgy; 5 pages.

Sintering—Wkipedia article; http://en.wikipedia.org/wiki/Sintering; 2 pages.

Magnetorheological fluid—Wikipedia article; http:en/wikipedia.org/wiki/Magnetorheological_fluid.

PCT/US2008/087354 Written Opinion and Search Report; Date of Mailing: Aug. 3, 2009; 9 pages.

PCT/US2009/039839 Written Opinion and Search Report; Date of Mailing: Nov. 24, 2009; 7 pages.

PCT/US2009/048424 Written Opinion and Search Report; Date of Mailing; Dec. 28, 2009; 7 pages.

U.S. Appl. No. 12/328,989, filed Dec. 5, 2008; First Named Inventor: Patrick J. Monsere.

U.S. Appl. No. 12/420,259, filed Apr. 8, 2009; First Named Inventor: Michael D. Hanna.

U.S. Appl. No. 12/434,057, filed May 1, 2009; First Named Inventor: Chongmin Kim.

U.S. Appl. No. 12/436,830, filed May 7, 2009; First Named Inventor: James G. Schroth.

U.S. Appl. No. 12/489,901, filed Jun. 23, 2009; First Named Inventor: Michael D. Hanna.

U.S. Appl. No. 12/885,813, filed Sep. 20, 2010; First Named Inventor: Michael D. Hanna.

* cited by examiner

COULOMB DAMPED DISC BRAKE ROTOR AND METHOD OF MANUFACTURING

TECHNICAL FIELD

The present invention relates to a coulomb damped disc brake rotor and a method of manufacturing coulomb damped disc brake rotors in which a coulomb damper insert is cast into the disc brake rotor in a manner to provide improved noise damping without subjecting the rotor to corrosion.

BACKGROUND OF THE INVENTION

Motor vehicle disc brake systems utilize a disc brake rotor at each respective wheel. The disc brake rotor typically includes a rotor hat for connecting to an axle hub of a rotatable axle of the motor vehicle, and at least one annular rotor cheek connected to the rotor hat. The at least one rotor cheek has a pair of mutually opposed braking surfaces onto which brake pads are selectively applied when braking is desired. Typically, the rotor cheek configuration may be solid, in which case a single rotor cheek has opposing braking surfaces thereon, or may be vented, in which case a pair of rotor cheeks are mutually separated by a web of ventilation vanes and each rotor cheek provides a respective braking surface so that, in combination, two mutually opposed braking surfaces are provided.

The disc brake system further typically includes a caliper which supports a mutually opposed pair of brake pads, one brake pad disposed overlying a respective rotor cheek braking surface, wherein the caliper, the brake pads, and other associated brake components collectively form a "brake corner". Normally, the caliper keeps the brake pads separated from the braking surfaces of the one or more rotor cheeks. Braking of the motor vehicle occurs at the brake corner by the caliper pressing the brake pads upon the braking surfaces of the one or more rotor cheeks. Frictional interaction between the one or more rotating rotor cheeks and non-rotating brake pads causes braking of the motor vehicle to transpire, the rate of braking depending upon the pressure of the brake pads against the braking surfaces.

Brake squeal may be undesirably generated at the brake corner when braking occurs. This brake squeal is the result of modal excitations of the disc brake rotor (composed usually of cast iron) by the frictional material of the brake pads. It is known in the prior art that brake squeal can be addressed by reducing modal excitation on the disc brake rotor by the friction material of the brake pads (i.e., lowering the frictional coefficient), by modifying the modal excitation response of the brake corner via changing the modal properties of the rotor cheeks (i.e., in terms of resonant frequencies, mode shapes, and structural damping through higher carbon content of the one or more rotor cheeks and/or increasing the disc brake rotor mass, or using exotic, expensive materials), and by introducing additional damping, for example, via a shim disposed at a backing plate of the brake pads.

The aforementioned brake squeal countermeasures are relatively effective for most brake corner designs, but they may require a significant amount of testing and analytical resources in order to be effective. Unfortunately, brake corners for performance motor vehicles, or those motor vehicles with high friction lining materials, are resistant to the prior art brake squeal countermeasures, due to the high amount of modal excitation from the friction material of the brake pads.

SUMMARY OF THE INVENTION

A coulomb damper insert is provided that is sufficiently configured to be contained within a rotor cheek during casting of a disc brake rotor. The insert includes a generally annular body portion that is configured to be generally coextensive with the rotor cheek. At least one radially extending tab is provided which is operable to locate the insert during casting of the disc brake rotor. The tab at least partially defines an orifice operable to limit the external exposure of the coulomb damper insert contained within the rotor cheek following machining of the rotor cheek. The orifice is preferably elliptical in shape, but may be other known shapes as well. Additionally, the major axis of the orifice is preferably substantially coincident with the anticipated outside diameter of the of the machined rotor cheek.

In a preferred embodiment, the annular body is coated with a ceramic wash to substantially prevent bonding with the rotor cheek during casting of the disc brake rotor. Preferably, the tab is not coated with the ceramic wash to enable bonding between at least a portion of the tab and the rotor cheek during casting of the disc brake rotor. Further, the tab may be at least partially coated with a fluxing agent to promote bonding between the tab and at least a portion of the rotor cheek. The at least one tab may extend in one of a generally radially inwardly direction and a generally radially outward direction with respect to the generally annular body. A coulomb damped disc brake rotor incorporating the disclosed coulomb damper insert is also provided.

The invention also provides a method for manufacturing a coulomb damped disc brake rotor, including the steps of: (A) providing a mold having the general shape of the coulomb damped disc brake rotor; (B) placing a coulomb damper insert having a generally annular body and at least one tab extending generally radially from the generally annular body, wherein the at least one tab operates to locate the coulomb damper insert within the mold, and wherein the at least one tab at least partially defines an orifice; and (C) causing casting material to enter the mold to substantially encapsulate the coulomb damper insert with the casting material to form a rotor cheek of the coulomb damped disc brake rotor. The mold and insert may be placed in a generally horizontal or vertical orientation during the pouring of the casting material.

The method may further include coating the generally annular body with one of a ceramic and non-ceramic wash to substantially prevent bonding between the generally annular body and the casting material. Additionally, the method may include removing the coulomb damped disc brake rotor from the mold and removing at least a portion of the at least one tab defining the orifice, such that the external exposure of the coulomb damper insert is reduced.

These and other features and advantages of the present invention will become clearer from the following specification of a preferred embodiment.

BRIEF DESCRIPTION OF THE DRAWINGS

FIG. 1a is a schematic side sectional view of a coulomb damper insert positioned within a casting mold in accordance with the present invention;

FIG. 1b shows an enlarged view of area 1b identified in FIG. 1a;

FIG. 1c is a schematic side sectional view of the mold and coulomb damper insert of FIG. 1a, with the mold closed and molten material introduced into the mold to form a coulomb damped disc brake rotor in accordance with the invention;

FIG. 1d is a schematic side sectional view of the mold of FIG. 1a, with the mold opened and the coulomb damped disc brake rotor ejected from the mold in accordance with the invention.

DESCRIPTION OF THE PREFERRED EMBODIMENTS

Figure 1:
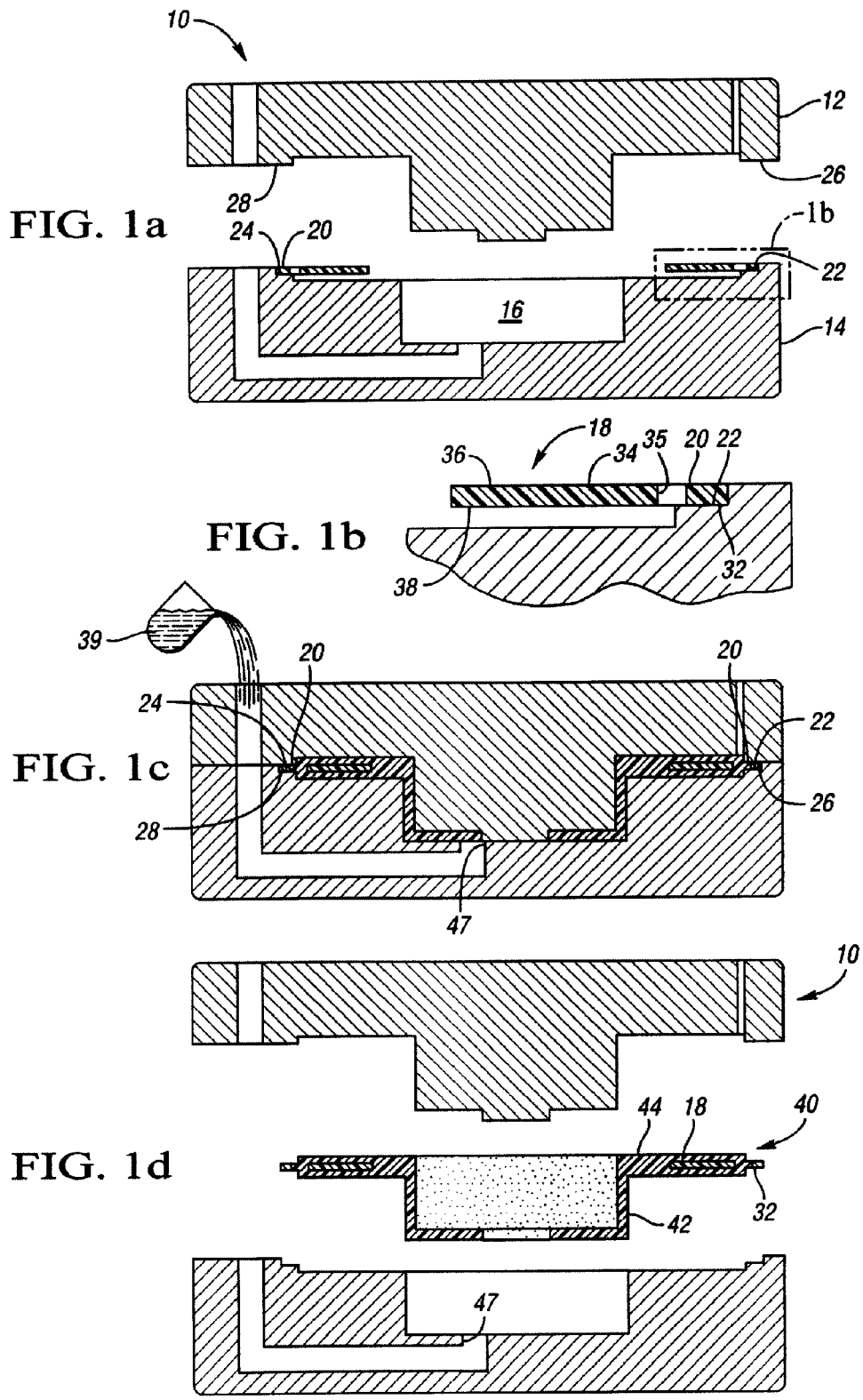

Referring to FIGS. 1a and 1b, a mold 10 in accordance with the invention having upper and lower mold halves 12, 14 that form a cavity 16 therebetween for casting a friction damped disc brake rotor in accordance with the invention. FIG. 1b shows a portion of a coulomb damper insert 18, highlighted in FIG. 1a, which is pre-positioned within the mold 10 and having tabs 20 which rest on cutout portions 22, 24 of the lower mold half 14. As shown in FIG. 1c, when the upper and lower mold halves 12, 14 are closed together, the tabs 20 are supported between the cutout portions 22, 24 of the lower mold half 14 and the lands 26, 28, respectively of the upper mold half 12.

Figure 2:
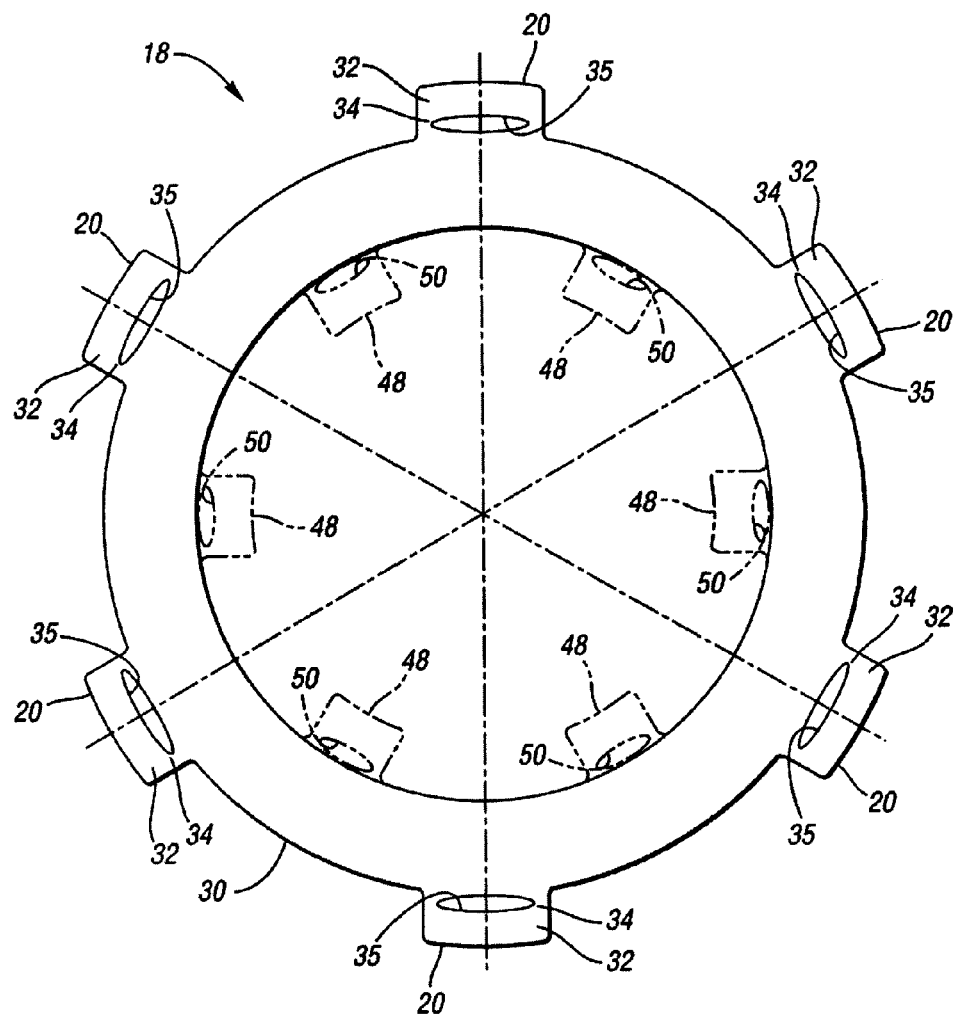
FIG. 2 is a plan view of the coulomb damper insert shown in FIGS. 1a-d, with alternative configurations shown in phantom.

Referring to FIG. 2, the coulomb damper insert 18 is shown in plan view. As shown, the coulomb damper insert 18 has a generally annular body 30 with tabs 20 extending therefrom. Each tab includes a distal portion 32 and a proximal portion 34. During casting, the distal portion 32 is secured between the cutout portions 22, 24 and the lands 26, 28, respectively, shown in FIG. 1c, while the proximal portion 34 of each tab 20 is exposed to molten casting material 39 within the mold cavity 16. The proximal portion 34 of each tab 20 at least partially defines an orifice 35 that is generally elliptical in shape. Those skilled in the art will recognize that the orifice 35 may be any shape, such as circular, diamond, rectangular, triangular, etc, while remaining within the scope of that which is claimed.

The mold 10 is preferably formed from sand, and the coulomb damper insert 18 is preferably a pre-manufactured steel component having a coating on opposing surfaces 36, 38 (shown in FIG. 1b) of the generally annular body 30. These coated surfaces 36, 38 do not bond with the casting material 39 during the casting operation, shown in FIG. 1c. The lack of "wetting" or affinity along these coated surfaces 36, 38 produces the unbonded interfacial boundary between the generally annular body 30 and a rotor cheek 44 desired for damping effectiveness. Optionally, the tabs 20, particularly the proximal portion 34 of each tab 20, may be configured in a manner to bond with the casting material 39 forming the rotor cheek 44 or a coulomb damped disc brake rotor 40, shown in FIG. 1d.

Since the coated surfaces 36, 38 of the coulomb damper insert 18 do not bond with the casting material 39 of the rotor cheek 44, a proper interfacial boundary is formed with the rotor cheek 44 for damping. However, the bonding of the tabs 20, particularly the proximal portions 34 thereof, with the casting material 39 of the rotor cheek 44 prevents corrosion causing exterior elements, such as water and salt, from reaching the interfacial boundary between the coulomb damper insert 18 and the rotor cheek 44. This bonding may be achieved by first coating the tabs 20 with the same material which forms the coated surfaces 36, 38 of the body 30 and then cleaning the coating off the tabs 20 at the proximal portions 34 to locally remove the coating to allow the tabs 20 to be micro-welded or otherwise bonded to the casting material 39 thereby effectively sealing the rest of the coulomb damper insert 18 to rotor cheek 44 interface from intrusion by water or other elements.

Alternatively, rather than applying a coating to the entire coulomb damper insert 18 and then locally cleaning the tabs 20, a graphite coating or similar fluxing agent may be applied to the tabs 20 to enhance bonding with the casting material 39. So-called "wetting" of the tabs 20 can also be accomplished by masking the tab 20 prior to application of the coating. The coulomb damper insert 18 may be formed from any material having a melting point higher than that of casting material 39, such that the coulomb damper insert 18 would not be melted during the casting process. In the preferred embodiment, the casting material 39 is iron and, as mentioned hereinabove, the coulomb damper insert 18 is formed from steel.

To apply the coating, the above-referenced coated surfaces 36, 38 must first be cleaned free of oil, rust or dirt. Degreasers may be used to remove thin films of oil, and steel wool may be used to remove rust. The best results are attained when the coulomb damper insert 18 is sand blasted, which removes both oil and rust. It also roughens the surface, which promotes adherence of the coating. The preferred coating material is a ceramic mold wash sold under the trade name IRONKOTE, and is available from Vesuvius Canada Refractories, Inc. of Welland, Ontario. IRONKOTE has alumina and silica particles mixed with an organic binder. It is approximately 47.5% alumina and 39.8% silica with a lignisole (lignosulfanate) binder. The coating preferably has a thickness between approximately 50 and 300 micrometers. It should be noted that other ceramic coatings that prevent wetting of the coulomb damper insert 18 and having a melting point higher than that of the casting material 39 may be used. Additionally, non-ceramic coatings such as those with hydrocarbon based carriers may be used while remaining within the scope of that which is claimed.

Once the insert is cleaned and free of oil and other contaminates, it is dipped in or sprayed with IRONKOTE on both surfaces 36, 38 and allowed to air dry. The coulomb damper insert 18 is then placed in an oven at 500 degrees F. for 45 minutes. This reduces the amount of absorbed water and organic binders within the ceramic coating, and provides a relatively uniform coating; however, it should be noted that alternate coatings may require alternate drying procedures. Once the coating process is completed, steel wool may be used to locally remove the coating from the tabs 20. With the coating removed from the tabs 20, bonding may occur between the casting material 39 and the tabs 20 of the coulomb damper insert 18.

Referring to FIG. 1d, the mold 10 is shown in the open position with the friction damped disc brake rotor 40 removed from the mold cavity 16, as shown in FIG. 1a. As shown, the coulomb damped disc brake rotor 40 has a hat portion 42 with the rotor cheek 44 extending about the periphery thereof, and the coulomb damper insert 18 positioned within the rotor cheek 44. The distal end 32 of each of the tabs 20 of the coulomb damper insert 18 is removed, such as by machining, after the coulomb damped disc brake rotor 40 is removed from the mold 10. The orifice 35 allows the tab 20 to maintain the support necessary to locate the coulomb damper insert 18 within the mold. However, once the distal end 32 of the tab 20 and/or the radial periphery of the rotor cheek 44 is machined, the presence of the orifice 35 reduces the external exposure of the coulomb damper insert 18 from within the rotor cheek 44, thus the likelihood of internal intrusion of external elements, such as water and salt, within the rotor cheek 44 is greatly reduced.

The locating tabs may be formed on the inside diameter (i.e. radially inwardly extending), outside diameter (i.e. radially outwardly extending), or both to locate and stabilize the coulomb damper insert 18 during the casting operation. For example, the coulomb damper insert 18 of FIG. 2 has optional radially inwardly extending internal tabs 48, shown in phantom, at least partially defining corresponding orifices 50, also shown in phantom. The number and placement of tabs 48 and 20 will depend, in part, on the specific rotor cheek 44 geometry and dimensions, and on the thickness of the coulomb damper insert 18.

The coulomb damper insert 18 is preferably 1.5 to 2 mm in thickness, but other thicknesses are envisioned. The thickness of the coulomb damper insert 18 is chosen to prevent bending or flexing of the coulomb damper insert 18 while not being so thick as to "chill" the surrounding molten casting material 39 during casting to the point that an objectionable amount of carbide is produced.

By enhancing the bond between the tabs 20, 48 and the casting material 39 forming the rotor cheek 44, the gap at the interface between the tabs 20, 48 and the rotor cheek 44 is substantially eliminated in order to isolate the interfaces between the coulomb damper insert 18 and the rotor cheek 44 from the exterior environment thereby eliminating corrosion issues in service of the coulomb damped disc brake rotor 40. The reduced peripheral area of the tabs 20, 48 exposed on the outer, or inner, periphery of the rotor cheek 44 created by the orifices 35, 50 respectively reduces the exposure of the coulomb damper insert 18 to the external environment while still providing the necessary support for the coulomb damper insert 18 to substantially locate and retain the coulomb damper insert 18 within the rotor cheek 44 during casting of the coulomb damped disc brake rotor 40. The location of the orifices 35 and 50 within the coulomb damper insert 18 are preferably chosen such that the area of the coulomb damper insert 18 exposed after the machining of the rotor cheek 44 is minimized. In the preferred embodiment, the major axis of the orifices 35 and 50 is located generally coextensively with the radial periphery of a rotor cheek 44 after finish machining of the rotor cheek 44. Additionally, more than one coulomb damper insert 18 may be cast within the rotor cheek 44.

Additionally, the orifices 35, 50 facilitate mold filling while reducing the tendency of the casting material 39 to move or dislodge the coulomb damper insert 18 during the casting operation. In other words, the orifices 35, 50 help to prevent molten casting material 39 from lifting or shifting the coulomb damper insert 18, as the mold 10 is filled from below through the gate 47, shown in FIG. 1c. By gating below the part and using a horizontal pouring process, the molten casting material 39 is not directed or splashed onto the coulomb damper insert 18 prematurely. Also, quiescent mold filling prevents splashing and premature solidification of droplets of molten casting material 39 on the coulomb damper insert 18 prior to general contact with molten casting material 39 during filling of the mold 10. Further, the molten casting material 39 is preferably filtered at the gate 47 with a ceramic filter, not shown, to reduce slag related defects. Although a generally horizontally parted mold 10 has been described hereinabove, those skilled in the art of casting will recognize that vertically parted molds may be utilized to form the coulomb damped disc brake rotor 40 of the present invention with the casting process determined by such aspects as casting volume, mold footprint, etc. Additionally various additional gating techniques may be envisioned while remaining within the scope of that which is claimed.

The present invention further provides a method of casting a coulomb damped disc brake rotor 40 including the steps of: A) providing the mold 10 having the general shape of the coulomb damped disc brake rotor 40; B) placing the coulomb damper insert 18 having a generally annular body 30 and at least one tab 20 extending generally radially from the generally annular body 30, wherein the at least one tab 20 operates to locate the coulomb damper insert 18 within the mold 10, and wherein the at least one tab 20 at least partially defines an orifice 35; and C) causing casting material 39 to enter the mold 10 to substantially encapsulate the coulomb damper insert 18 with the casting material 39 to form a rotor cheek 44 of the coulomb damped disc brake rotor 40.

The present invention may reduce disc brake squeal and may limit the potential for corrosion of the coulomb damper insert 18 after machining. It should be understood that the procedure outlined above can also be used with vented rotor cheek configurations, with a note that an insert or inserts are provided at both or selective one of the rotor cheeks. To those skilled in the art to which this invention pertains, the above described preferred embodiment may be subject to change or modification. Such change or modification can be carried out without departing from the scope of the invention, which is intended to be limited only by the scope of the appended claims.

The invention claimed is:

1. A method of casting a coulomb damped disc brake rotor comprising:
   providing a mold having the general shape of the coulomb damped disc brake rotor;
   placing a coulomb damping insert having a generally annular body, at least one tab extending generally radially from said generally annular body, and at least one orifice at least partially passing through each tab, wherein said at least one tab operates to locate said coulomb damper insert within said mold; and
   causing casting material to enter said mold to substantially encapsulate said coulomb damping insert with said casting material to form a rotor cheek of the coulomb damped disc brake rotor so that upon vibration of the rotor cheek the coulomb damping insert frictionally moves against a surface of the rotor cheek to dissipate vibration of the rotor cheek.

2. The method of claim 1, further comprising coating said generally annular body with a ceramic wash to substantially prevent bonding between said generally annular body and said casting material.

3. The method of claim 2, further comprising preventing said ceramic wash from contacting said at least one tab to promote bonding between said at least one tab and said rotor cheek.

4. The method of claim 1, wherein said casting material is allowed to flow through said at least one orifice to at least partially pass through each tab.

5. The method of claim 1, further comprising:
   removing the coulomb damped disc brake rotor from said mold; and
   removing at least a portion of said at least one tab such that the exposure of said coulomb damper insert external to said rotor cheek is reduced.

6. The method of claim 1, further comprising applying a fluxing agent to promote bonding between at least a portion of said at least one tab and said casting material.

7. The method of claim 1, wherein said coulomb damper insert is formed from steel and wherein said casting material is iron.

8. The method of claim 1, wherein said orifice is generally elliptical in shape.

9. A method as set forth in claim 1 wherein a portion of the insert is bonded to the rotor cheek.

10. A method of casting a brake rotor comprising:
    providing a mold comprising an upper mold half and a lower mold half and a cavity;
    placing in the lower mold half a brake rotor insert comprising an annular body portion comprising an inner circumference, an outer circumference, and two generally parallel and flat surfaces extending from the inner circumference to the outer circumference; at least one tab extending at least one of radially inward from the inner circumference or radially outward from the outer circumference, wherein the tab comprises a distal portion and a proximal portion; and at least one orifice at least partially passes through the proximal portion of the tab;

securing the brake rotor insert in the lower mold half by contacting the distal portion of the tab with the lower mold half;

placing the upper mold half over the lower mold half; and filling the mold with a casting material to substantially encapsulate the brake rotor insert with the casting material, wherein at least the distal portion of the tab is not exposed to the casting material.

11. A method as set forth in claim 10 further comprising: separating the brake rotor from the mold;
removing at least the distal portion of the at least one tab.

12. A method as set forth in claim 10 wherein the mold comprises sand.

13. A method as set forth in claim 10 further comprising applying a first coating over at least a portion of the annular body portion.

14. A method as set forth in claim 13 wherein the first coating comprises a ceramic wash.

15. A method as set forth in claim 14 wherein the ceramic wash comprises alumina particles, silica particles, and an organic binder.

16. A method as set forth in claim 13 further comprising cleaning at least a portion of the annular body portion before applying the first coating, wherein the cleaning comprises at least one of degreasing, using steel wool, or sand blasting.

17. A method as set forth in claim 13 further comprising applying a second coating over the at least a portion of the at least one tab.

18. A method as set forth in claim 17 wherein the second coating comprises a fluxing agent.

19. A method as set forth in claim 17 wherein the second coating comprises graphite.

20. A method as set forth in claim 10 wherein the casting material has a lower melting point than the brake rotor insert.

21. A method as set forth in claim 10 wherein the casting material comprises iron.

22. A method as set forth in claim 10 wherein the brake rotor insert comprises steel.

23. A method as set forth in claim 10 wherein the casting material flows through the at least one orifice to at least partially pass through the proximal portion of the tab.

24. A method as set forth in claim 10 wherein a portion of the insert is bonded to the casting material.

25. A method as set forth in claim 10 wherein the orifice has a major axis generally coincident with the periphery of the brake rotor.

26. A method as set forth in claim 10 wherein the orifice is generally elliptical in shape.

27. A method of making a damped device comprising:
providing an insert having a generally annular body and at least one tab extending generally radially from said generally annular body, wherein at least one orifice at least partially passes through each tab, casting a first metal around the insert comprising a second metal, wherein the insert has a higher melting point than the first metal and so that the insert is not bonded to the first metal, and a boundary is provided between the insert and the first metal sufficient to provide damping.

28. A method as set forth in claim 27 wherein the first metal comprises cast iron and the second metal comprises steel.

29. A method of casting a coulomb damped brake rotor comprising:
providing a mold having the general shape of the coulomb damped brake rotor;
placing an insert having a body portion and at least one tab extending from the body;
casting material to form a brake rotor and so that at least a portion of the tab is encapsulated by the material and the material is bonded to the tab and so that at least a portion of the body is not bonded to the material to provide an unbounded interfacial boundary for coulomb damping of the brake rotor.

30. A method as set forth in claim 29 wherein the body portion is an annular body portion and wherein the at least one tab extending from the body extends radially from the annular body portion.

31. A method of casting a brake rotor comprising:
providing a mold comprising an upper mold half and a lower mold half and a cavity;
placing in the lower mold half a brake rotor insert comprising an annular body portion comprising an inner circumferential edge, an outer circumferential edge, and two generally parallel and flat surfaces extending from the inner circumferential edge to the outer circumferential edge; at least one tab extending in the same plane as the body portion and extending from one of the inner circumferential edge or the outer circumferential edge;
securing the brake rotor insert in the lower mold half by contacting the distal portion of the tab with the lower mold half;
placing the upper mold half over the lower mold half; and
filling the mold with a casting material to substantially encapsulate at least a portion of the tab and so that at least a portion of the body is not bonded to the material to provide a non-bonded interfacial boundary for coulomb damping of the brake rotor.

* * * * *